United States Patent
Yoshimura et al.

(10) Patent No.: US 10,778,356 B2
(45) Date of Patent: Sep. 15, 2020

(54) TERMINAL DEVICE AND COMMUNICATION METHOD

(71) Applicant: JVC KENWOOD Corporation, Yokohama-shi, Kanagawa (JP)

(72) Inventors: Motoshi Yoshimura, Yokohama (JP); Hiroshi Koike, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 111 days.

(21) Appl. No.: 16/100,273

(22) Filed: Aug. 10, 2018

(65) Prior Publication Data
US 2019/0068306 A1    Feb. 28, 2019

(30) Foreign Application Priority Data
Aug. 31, 2017   (JP) .................... 2017-166616

(51) Int. Cl.
*H04J 3/02* (2006.01)
*H04W 72/04* (2009.01)
*H04W 74/00* (2009.01)

(52) U.S. Cl.
CPC ........... *H04J 3/02* (2013.01); *H04W 72/0446* (2013.01); *H04W 74/00* (2013.01)

(58) Field of Classification Search
CPC ...... H04J 3/02; H04W 74/00; H04W 72/0446
See application file for complete search history.

(56) References Cited

U.S. PATENT DOCUMENTS

| | | | |
|---|---|---|---|
| 2010/0157958 A1* | 6/2010 | Wong .................. | H04W 72/005 370/337 |
| 2014/0233447 A1* | 8/2014 | Ofir ........................ | H04W 4/10 370/312 |
| 2019/0014599 A1* | 1/2019 | Asterjadhi ............ | H04W 74/04 |

* cited by examiner

*Primary Examiner* — Shailendra Kumar
(74) *Attorney, Agent, or Firm* — Brundidge & Stanger, P.C.

(57) ABSTRACT

In a terminal device, a communication unit performs communication using one of a plurality of time slots in a communication channel. A switching unit switches a time slot for transmission when a predetermined switching condition is determined to be met by referring to a reception signal received in the communication unit and maintains the time slot for transmission until the switching condition is determined to be met again by referring to the reception signal.

5 Claims, 4 Drawing Sheets

TERMINAL DEVICE AND COMMUNICATION METHOD

CROSS-REFERENCE TO RELATED APPLICATION

This application is based upon and claims the benefit of priority from the prior Japanese Patent Application No. 2017-166616, filed on Aug. 31, 2017, the entire contents of which are incorporated herein by reference.

BACKGROUND

1. Field

The present invention relates to communication technologies and, more particularly, to terminal devices and communication methods capable of performing business wireless communication.

2. Description of the Related Art

A wireless communication device is known that performs communication using one of a plurality of time slots according to the Time Division Multiplex Access (TDMA) technology (see, for example, patent document 1). When a default time slot is not available for use, the wireless communication device searches for a time slot available for use, selects a time slot available for use temporarily, and starts communication. When the default time slot is made available for use, the wireless communication devices re-selects the default time slot.

[patent document 1] US2010/0157958

According to to the technology described above, a search is made for a time slot available for use when the default time slot is not available for use. It is therefore difficult to start transmission promptly. Since the default time slot is re-selected, it is not possible to perform transmission using the time slot used in the phone call again.

SUMMARY

A terminal device according to an embodiment comprises: a communication unit that performs communication using one of a plurality of time slots in a communication channel; and a switching unit that switches a time slot for transmission when a predetermined switching condition is determined to be met by referring to a reception signal received in the communication unit and maintains the time slot for transmission until the switching condition is determined to be met again by referring to the reception signal.

Another embodiment relates to a communication method. The method is adapted for a terminal device that performs communication using one of a plurality of time slots, the method comprising: switching a time slot for transmission when a predetermined switching condition is determined to be met by referring to a reception signal received; and maintaining the time slot for transmission until the switching condition is determined to be met again by referring to the reception signal received.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The invention will now be described by reference to the preferred embodiments. This does not intend to limit the scope of the present invention, but to exemplify the invention.

A summary of the present invention will be given before describing the invention in specific detail. The embodiment relates to a terminal device capable of communicating using a business wireless system of communication. The terminal device of the embodiment is a wireless transceiver. In business wireless communication, speech communication is performed. An example of speech communication is Push to Talk (PTT). In PTT, the user pushes a PTT button to initiate a phone call and releases the PTT button to end the phone call. In business wireless communication, it is also possible to form a group by a plurality of terminal devices.

DMR (Digital Mobile Radio) is known as a standard of the communication scheme in business wireless communication. DMR is a TDMA standard in which two time slots are assigned to one communication channel. A plurality of terminal devices use one of the two time slots in one communication channel for communication. By assigning different time slots to two groups, the two groups can perform communication individually by sharing one communication channel. As mentioned already, there is room for improvement in the operation of switching between time slots for transmission.

The terminal device according to the embodiment addresses the issue by switching a time slot for transmission when a reception signal meets a predetermined switching condition and maintains the time slot for transmission until the reception signal meets the switching condition again.

Figure 1:
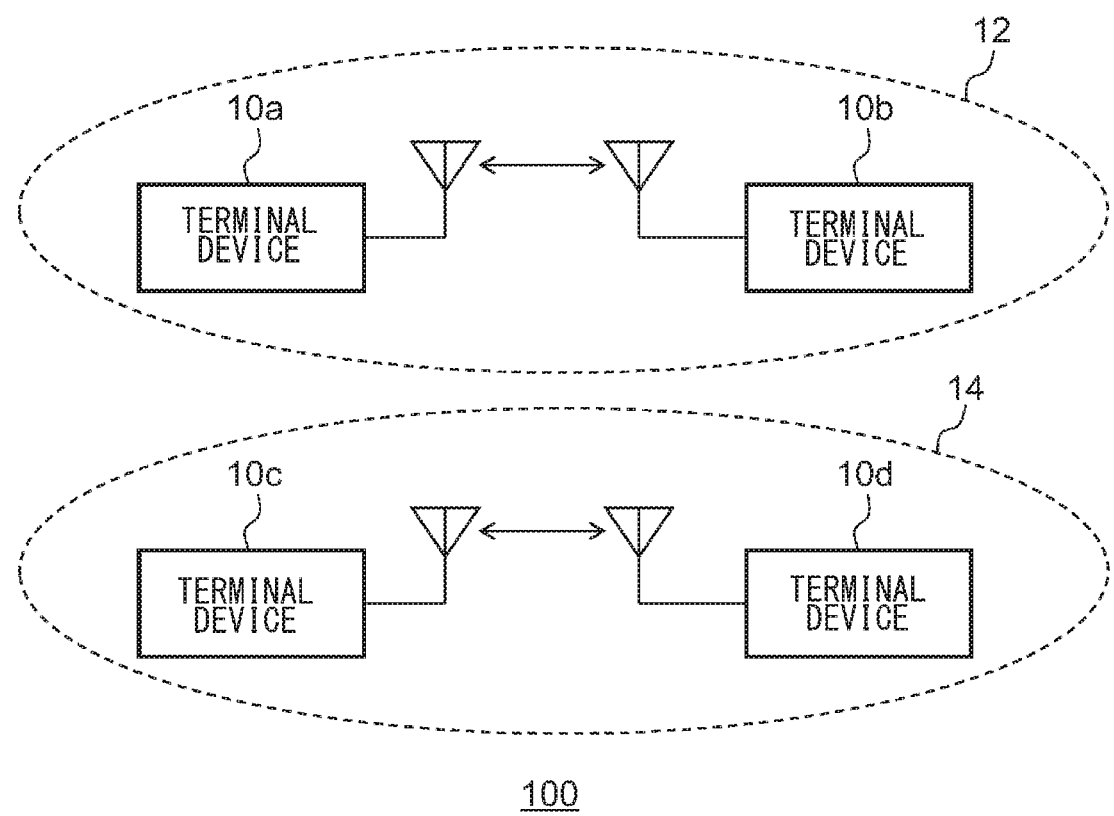
FIG. 1 is a block diagram showing a configuration of a communication system according to the embodiment.

FIG. 1 is a block diagram showing a configuration of a communication system 100 according to the embodiment. The communication system 100 includes a first terminal device 10a, a second terminal device 10b, a third terminal device 10c, a fourth terminal device 10d, which are generically referred to as terminal devices 10. The number of terminal devices 10 is not limited to "4".

The terminal device 10 is a wireless terminal capable of communicating with another terminal device 10 using business wireless communication. Phone-call communication is assumed herein. Data communication may also take place. A publicly known DRM technology may be used for business wireless communication so that a description thereof is omitted. For example, the first terminal device 10a and the second terminal device 10b form a first group 12, and the third terminal device 10c and the fourth terminal device 10d form a second group 14. In this way, a plurality of groups each including a plurality of terminal devices 10 are formed. The number of terminal devices 10 included in one group is not limited to "2". In each group, communication from one of the terminal devices 10 included in the group to the other terminal device 10 included in the group takes place. As mentioned already, one communication channel includes two time slots according to the DMR technology. It is therefore possible to perform half-duplex communication on two lines using one communication channel, i.e., one frequency. For this reason, the communication channel that the plurality of terminal devices 10 of the first group 12 use for communication may be identical to the communication channel that the plurality of terminal devices 10 of the second group 14 use for communication. Hereinafter, the two time slots will be referred to as a time slot 1 and a time slot 2.

The plurality of terminal devices 10 may be connected to a base station device (not shown). In this case, the the plurality of terminal devices 10 can communicate with each other via the base station device. The base station device assigns an upstream channel and a downstream channel to a group. In this setup, one of the terminal devices 10 in a group transmits a signal using the upstream channel, and the other terminal device 10 in the group receives the signal using the downstream channel. Each of the upstream channel and the downstream channel has the time slot 1 and the time slot 2.

Figure 2:
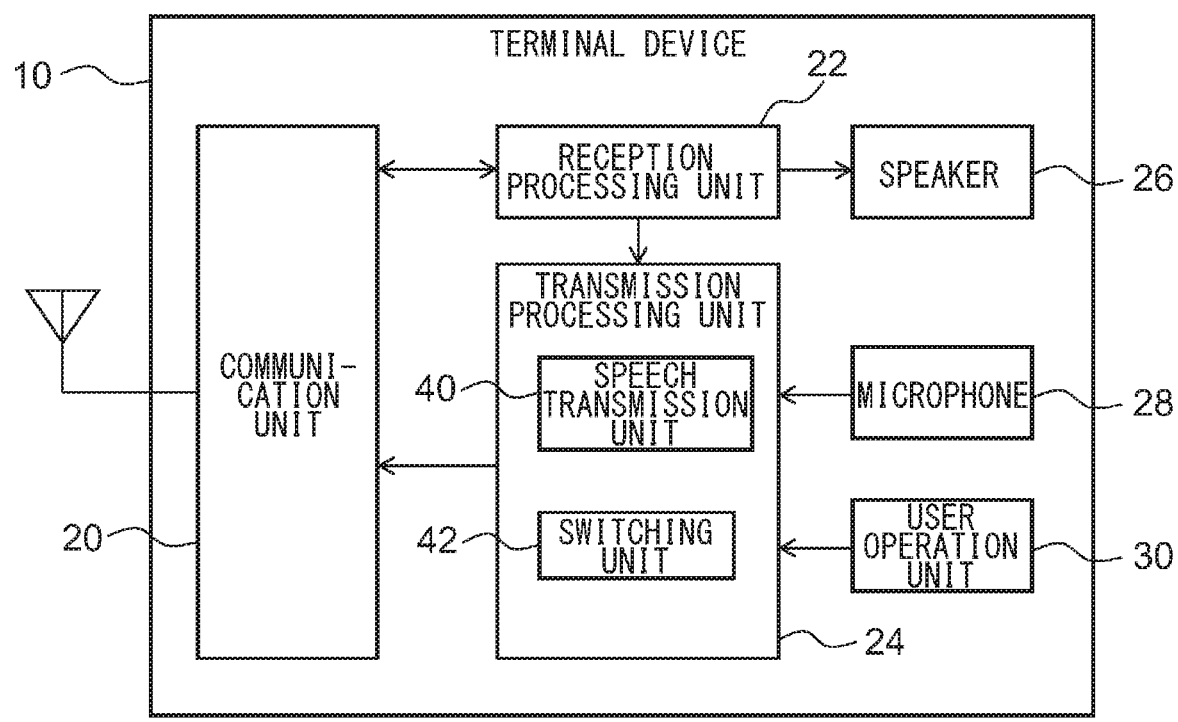
FIG. 2 is a block diagram showing a configuration of the terminal device of FIG. 1.

FIG. 2 is a block diagram showing a configuration of the terminal device 10. The terminal device 10 includes a communication unit 20, a reception processing unit 22, a transmission processing unit 24, a speaker 26, a microphone 28, and a user operation unit 30. The transmission processing unit 24 includes a speech transmission unit 40 and a switching unit 42.

The communication unit 20 is a wireless communication circuit compatible with DMR and communicates with another terminal device 10 within the home group using one of the two time slots of the communication channel. The communication unit 20 receives a signal from another terminal device 10 and transmits a signal to another terminal device 10. The reception processing unit 22 is a reception control circuit that detects the reception signal received in the communication unit 20 and exercises control based on the detected reception signal. The transmission processing unit 24 is a transmission control circuit that digitizes the user's speech and selects which slot should be used to transmit the digitized speech signal. The speech transmission unit 40 of the transmission processing unit 24 is an A/D converter that digitizes the user's speech and outputs the digitized speech signal to the communication unit 20. The switching unit 42 of the transmission processing unit 24 is a slot selection circuit that selects which slot should be used to transmit the digitized speech signal according to a predetermined condition. A part or the entirety of the wireless communication circuit, the reception control circuit, the transmission control circuit, and the slot selection circuit may be implemented by causing a processor to execute a program.

The reception processing unit 22 detects the reception signal received in the communication unit 20. The reception signal received in the communication unit 20 may be transmitted from another terminal device 10 at the transmitting end within the home group or may be transmitted from another terminal device 10 of another group sharing the communication channel of the home group. The reception processing unit 22 determines whether the reception signal is destined to the host terminal device 10 based on the identifier included in the reception signal. The identifier includes a terminal device ID. The terminal device ID is a number uniquely identifying the terminal device 10. When the terminal device ID included in the reception signal matches the terminal device ID of the host terminal device 10, the reception processing unit 22 determines that the reception signal is destined to the host terminal device 10. When the terminal device ID included in the reception signal does not match the terminal device ID of the host terminal device 10, the reception processing unit 22 determines that the reception signal is destined to another terminal device 10. The identifier may further include a color code representing a predetermined number. Further, the reception processing unit 22 determines whether the time slot for the reception signal is the time slot 1 or the time slot 2 by referring to information on the time slot included in the reception signal.

When the terminal device 10 is powered on, the reception processing unit 22 mutes a speech signal. When the reception signal is not destined to the host terminal device 10, the reception processing unit 22 continues muting the speech signal. By muting the speech signal, the speaker 26 does not output a speech. Meanwhile, when the reception signal is destined to the host terminal device 10, the reception processing unit 22 stops muting the speech signal, demodulates the speech signal, and plays back the speech signal. This process is performed regardless of whether the time slot for the reception signal is the time slot 1 or the time slot 2. More specifically, the reception processing unit 22 in this case causes the communication unit 20 to subject the reception signal to amplification, frequency conversion, demodulation, decoding, etc. The communication unit 20 outputs the result of the process (hereinafter, also referred to as "speech signal") to the reception processing unit 22. The reception processing unit 22 plays back the speech signal. The reception processing unit 22 outputs the speech signal to the speaker 26. The speaker 26 receives the speech signal from the reception processing unit 22 and outputs the speech signal as a speech. The speaker 26 also outputs an alert sound, etc.

The reception processing unit 22 outputs information indicating whether a reception signal is detected, whether the reception signal is destined to the host terminal device 10, and whether the time slot for the reception signal is the time slot 1 or the time slot 2 to the transmission processing unit 24.

The microphone 28 receives a speech from the user in a phone call and converts the speech into a speech signal. The microphone 28 outputs the speech signal to the transmission processing unit 24. The user operation unit 30 is comprised of devices such as a switch that receives a user operation for transmission, a volume controller, etc. One of the buttons of the user operation unit 30 corresponds to a PTT button and is pressed by the user to transmit a speech using PTT. The PTT button remains pressed while the speech is being transmitted. Pressing of the PTT button corresponds to receiving a user operation for transmitting a speech signal. The PTT button continues to output an instruction to the transmission processing unit 24 while the PTT button is being pressed. The user operation unit 30 is further provided with a volume controller for adjusting the volume of demodulated sound, a switch for selecting a destination of transmission (intended recipient), a switch for an emergency call, etc.

When an instruction is received from the user operation unit 30, the speech transmission unit 40 receives the speech signal from the microphone 28. The speech transmission unit 40 converts the analog speech signal into a digital signal and outputs the speech signal converted into the digital signal (hereinafter, also referred to as "speech signal") to the communication unit 20. Meanwhile, the speech transmission unit 40 does not perform such a process when an instruction is not received from the user operation unit 30. The communication unit 20 receives the speech signal from the speech transmission unit 40 and uses the time slot 1 or the time slot 2 to transmit the speech signal to another terminal device 10 at the receiving end. For transmission of the speech signal, the communication unit 20 performs coding, modulation, frequency conversion, amplification, etc.

Transmission of the speech signal by the communication unit 20 and the choice of the time slot for transmission are controlled by the switching unit 42 as described below in accordance with the reception signal. For clarity of the explanation, the description will be given in the order (1) in the case where a reception signal is not detected yet, (2) in the case where the detected reception signal is destined to the host terminal device 10, and (3) in the case where the detected reception signal is not destined to the host terminal device 10.

(1) In the case where a reception signal is not detected yet

A time slot for transmission is set in the transmission processing unit 24. It will be assumed hereinafter that the time slot set for transmission is the time slot 1 but it may be the time slot 2. When the reception processing unit 22 has not detected a reception signal yet and the user operation unit 30 receives a user operation for transmission, the switching unit 42 causes the communication unit 20 to perform transmission using the time slot 1, which is the time slot set for transmission. It should be noted that an initial time slot is available as the time slot for transmission. The initial time slot is set after the terminal device 10 is powered on. As described later, however, the time slot for transmission is set in accordance with the past reception signal.

(2) In the case where the detected reception signal is destined to the host terminal device 10

When a reception signal is detected, the reception processing unit 22 causes the communication unit 20 to decode the reception signal. The reception processing unit 22 determines the time slot by referring to the decoded signal and performs demodulation accordingly. When the reception signal meets a predetermined switching condition, the switching unit 42 switches the time slot for transmission and maintains the time slot for transmission until the reception signal meets the switching condition again. In this way, the time slot for transmission is re-set as appropriate.

More specifically, the switching unit 42 defines the time slot for reception to be the time slot for transmission. The switching unit 42 switches the time slot for transmission on the condition that the reception signal is destined to the host terminal device 10 and the time slot for the reception signal is different from the time slot set for transmission. In other words, given that the time slot for the reception signal is the time slot 2 and the time slot for transmission is set to be the time slot 1, the switching unit 42 switches the time slot for transmission to the time slot 2. Meanwhile, given that the reception signal is destined to the host terminal device 10 and the time slot for the reception signal is identical to the time slot set for transmission, the switching unit 42 maintains the time slot for transmission. In other words, given that the time slot for the reception signal is the time slot 1, the switching unit 42 maintains the time slot for transmission to be the time slot 1 currently set.

The transmission processing unit 24 receives a selection of a destination of transmission from the user operation unit 30 except when transmission is proceeding. In other words, the user operation unit 30 also functions as a destination of transmission selection unit for selecting a destination of transmission. Further, a selection of a destination of transmission may be received even while the reception processing unit 22 is demodulating the reception signal destined to the host terminal device 10. In other words, a terminal device other than the terminal device originating the reception signal destined to the host device may be selected as a destination of transmission even while the reception signal destined to the host terminal device 10 is being demodulated. Even if the destination of transmission is selected and set, the current reception signal continues to be demodulated.

When a terminal device other than the terminal device originating the reception signal destined to the host device is selected and set as the destination of transmission, the switching condition will be met and the time slot for transmission is set to be the time slot different from the time slot for the reception signal. In other words, the switching unit 42 switches the time slot for transmission when the reception signal is destined to the host terminal device 10 and the time slot for the reception signal is identical to the time slot set for transmission. In other words, given that time slot for the reception signal is the time slot 1, the switching unit 42 switches the time slot for transmission to the time slot 2.

When the user operation unit 30 receives a user operation for transmission, the switching unit 42 causes the communication unit 20 to perform transmission using the time slot set for transmission.

Thus, when the communication unit 20 receives a signal destined to the host terminal device 10, the communication unit 20 uses the time slot set in accordance with the switching condition to perform transmission.

The transmission processing unit 24 may be provided with the capabilities to define whether to accept or reject a user operation for transmission when a reception signal is being detected by the communication unit 20. The transmission processing unit 24 may further define whether to accept or reject a user operation for transmission when the reception signal is destined to the host terminal device 10 and the reception signal is continuing. This prevents transmission from being performed in the presence of a reception signal destined to the host terminal device 10 being received. The terms "receives a user operation for transmission" and "does not receive a user operation for transmission" mean that "a user operation for transmission is detected" and "a user operation for transmission is not detected". In other words, the terms signify determination as to whether the user using the terminal device 10 has performed a user operation for transmission. Meanwhile, "reject a user operation for transmission" means not initiating a transmission status even if a user operation for transmission is detected. In other words, it means that a transmission status is not initiated even if the user using the terminal device 10 has performed a user operation for transmission.

(3) When the detected reception signal is not destined to the host terminal device 10

When the reception signal is not destined to the host terminal device 10, the switching unit 42 maintains the time slot set for transmission. Further, the switching unit 42 maintains the time slot set for transmission when it cannot be determined whether the reception signal is destined to the host terminal device 10. For example, when the reception signal is weak, or represents noise or jamming waves not relevant to communication, and when a time slot cannot be determined by referring to the signal decoded by the reception processing unit 22, it is determined that the switching condition is not met and the time slot currently set for transmission is maintained.

When the reception signal is not destined to the host terminal device 10 and the time slot for the reception signal is different from the time slot set for transmission, the switching unit 42 determines that the switching condition is not met and does not switch the time slot for transmission when the user operation unit 30 acknowledges a user operation for transmission. Meanwhile, when the reception signal is not destined to the host terminal device 10 and the time slot for the reception signal is identical to the time slot set for transmission, the switching unit 42 determines that the switching condition is met and switches the time slot for transmission when the user operation unit 30 acknowledges a user operation for transmission. In this process, the switching unit 42 switches the time slot for transmission without checking whether the time slot to switch to is available for use. In other words, given that time slot for the reception signal is the time slot 1, the switching unit 42 switches the time slot for transmission to the time slot 2.

When the user operation unit 30 receives a user operation for transmission, the switching unit 42 causes the communication unit 20 to perform communication using the time slot for transmission.

The features are implemented in hardware such as a CPU, a memory, or other LSI's, of any computer and in software such as a program loaded into a memory. The figure depicts functional blocks implemented by the cooperation of these elements. Therefore, it will be understood by those skilled in the art that the functional blocks may be implemented in a variety of manners by hardware only, software only, or by a combination of hardware and software.

Figure 3:
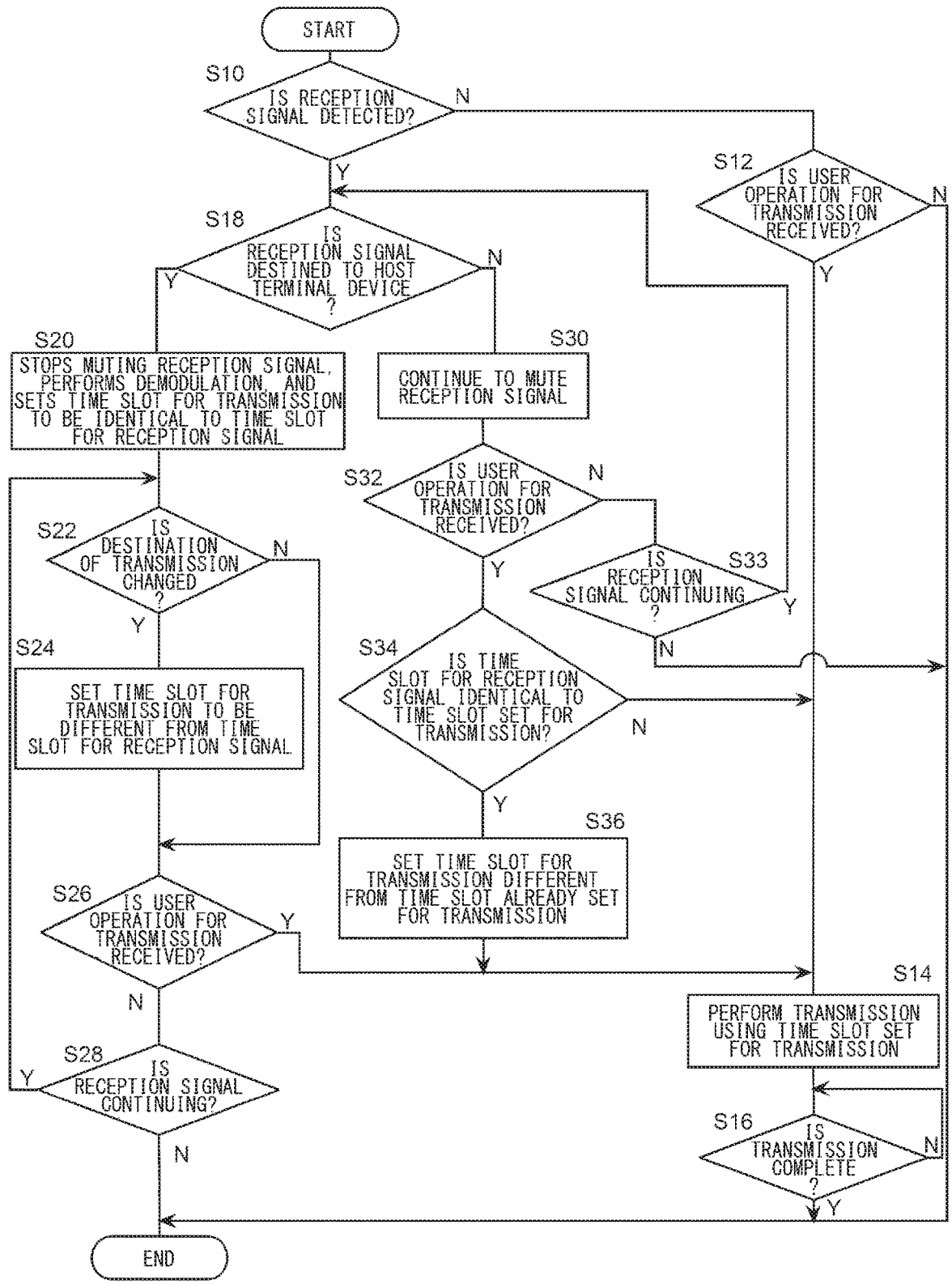
FIG. 3 is a flowchart showing the process in the terminal device of FIG. 1.

A description will now be given of the operation of the terminal device 10 having the configuration described above. FIG. 3 is a flowchart showing the process in the terminal device 10. The process is repeatedly performed. When the reception processing unit 22 has not detected a reception signal yet (N in S10) and the user operation unit 30 does not receive a user operation for transmission (N in S12), the process is terminated. When the user operation unit 30 receives a user operation for transmission (Y in S12), the communication unit 20 performs transmission using the time slot set for transmission (S14). When the transmission is not complete (N in S16), the transmission is maintained. When the transmission is complete (Y in S16), the process is terminated.

When the reception processing unit 22 detects a reception signal in step 10 (Y in S10) and the reception signal is destined to the host terminal device 10 (Y in S18), the reception processing unit 22 stops muting the reception signal and causes the communication unit 20 to perform demodulation (S20). When the time slot for the reception signal is the time slot set for transmission, the time slot set for transmission is maintained. When the time slot for the reception signal is not the time slot set for transmission, the time slot for transmission is set to be identical to the time slot for the reception signal (S20). The destination of transmission is configured to be changeable even while the demodulation is proceeding, and the demodulation is continued even after the destination of transmission is changed.

When a user operation to configure a destination of transmission is received (Y in S22), it is determined that the switching condition is met, and the time slot for transmission is set to be the time slot different from the time slot for the reception signal (S24). When a user operation to configure a destination of transmission is not received (N in S22), the time slot currently set for transmission is maintained. When a user operation to configure a destination of transmission is performed multiple times while the reception is proceeding, the switching condition has already been met so that the time slot for transmission is maintained to be the time slot different from the time slot for the reception signal.

When the user operation unit 30 does not receive a use operation for transmission (N in S26), it is determined whether the reception signal is continuing (S28). When the reception signal is continuing (Y in S28), control returns to S22. When the reception signal is not continuing (N in S28), the process is terminated.

When the user operation unit 30 receives a user operation for transmission (Y in S26), the communication unit 20 performs communication using the time slot set for transmission (S14). When the transmission is not complete (N in S16), the transmission is maintained. When the transmission is complete (Y in S16), the process is terminated.

When it is determined in step S18 that the reception signal is not destined to the host terminal device 10 (N in S18), the reception processing unit 22 continues to mute the reception signal (S30). When the user operation unit 30 does not receive a user operation for transmission (N in S32) and the reception signal is continuing (Y in S33), control proceeds to step 18. When the reception signal has ended (N in S33), the process is terminated. When the user operation unit 30 receives a user operation for transmission (Y in S32) and the time slot for the reception signal is not identical to the time slot set for transmission (N in S34), control proceeds to step 14. When the time slot for the reception signal is identical to the time slot set for transmission (Y in S34), the communication unit 20 sets the time slot for transmission to be different from the time slot already set for transmission (S36). The communication unit 20 performs transmission using the time slot set for transmission (S14). When the transmission is not complete (N in S16), the transmission is maintained. When the transmission is complete (Y in S16), the process is terminated.

Figure 4:
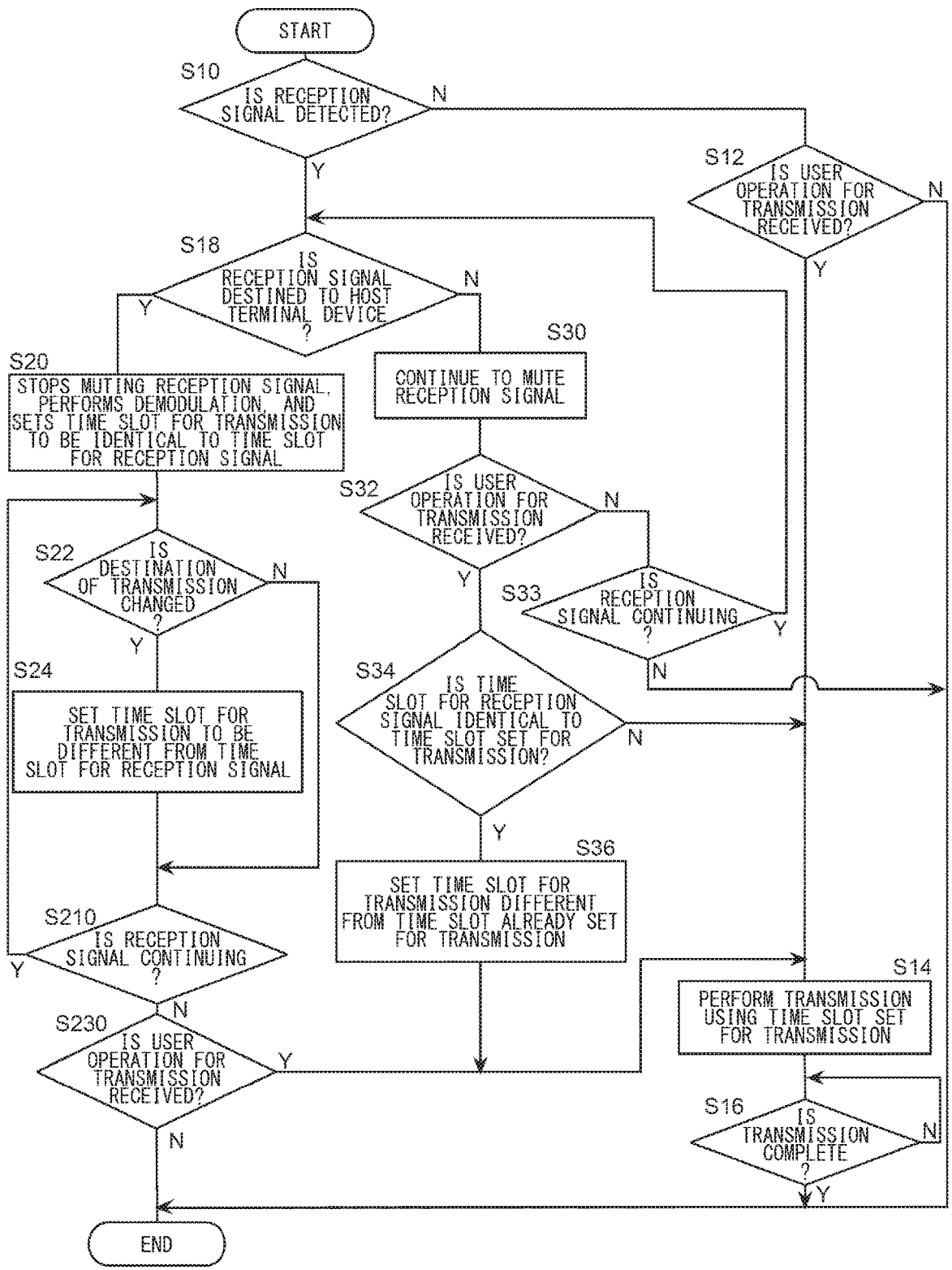
FIG. 4 is a flowchart showing another process in the terminal device of FIG. 1.

The process in which a user operation for transmission is rejected when the reception signal destined to the host terminal device 10 is continuing is shown in FIG. 4. FIG. 4 is a flowchart showing another process in the terminal device 10 of FIG. 1.

The process of FIG. 4 is identical to that of the flowchart of FIG. 3 through step 24. When the reception signal is continuing (Y in S210), control returns to step 22. When the reception signal is not continuing (N in S210), it is determined in step 230 whether a user operation for transmission is received. When a user operation for transmission is received (Y in S230), transmission is performed using the time slot set for transmission (step 14). When a user operation for transmission is not received (N in S230), the process is terminated.

Thus, according to the embodiment, the time slot for transmission is switched when the reception signal meets a predetermined switching condition. Therefore, the time slot can be switched without making a search. Accordingly, the likelihood of promptly starting transmission is increased. Further, when the time slot for transmission is switched, the time slot for transmission is maintained until the reception signal meets the predetermined condition again. Therefore, the time slot in which transmission was possible can be maintained in subsequent transmission.

Further, when the reception signal is not destined to the host terminal device and the time slot for the reception signal is identical to the time slot for transmission, the time slot for transmission is switched. Therefore, transmission can be performed using the time slot different from the time slot for the reception signal of another group. When the reception signal is destined to the host terminal device and the time slot for the reception signal is different from the time slot for transmission, the time slot for transmission is switched.

Therefore, transmission can be performed using the time slot for the reception signal of the host group.

Described above is an explanation based on an exemplary embodiment. The embodiment is intended to be illustrative only and it will be understood by those skilled in the art that various modifications to constituting elements and processes could be developed and that such modifications are also within the scope of the present invention.

For example, three or more time slots may be assigned to one communication channel instead of two time slots assigned to one communication channel.

What is claimed is:

1. A terminal device comprising:
    a communication circuit that performs communication using one of a plurality of time slots in a communication channel; and
    a switching circuit that:
        switches a time slot for transmission when a predetermined switching condition is determined to be met by referring to a reception signal received in the communication circuit, and
        maintains the time slot for transmission until the predetermined switching condition is determined to be met again by referring to the reception signal,
    wherein, when the reception signal is not destined to the terminal device and a time slot for the reception signal is identical to the time slot for transmission, the switching circuit determines that the switching condition is met and switches the time slot for transmission, and
    wherein, when the reception signal is destined to the terminal device and a time slot for the reception signal is different from the time slot for transmission, the switching circuit determines that the switching condition is met and switches the time slot for transmission.

2. The terminal device according to claim 1, further comprising a destination of transmission selection circuit, and
    wherein when the reception signal is destined to the terminal device, a time slot for the reception signal is identical to the time slot for transmission, and the destination of the transmission selection circuit selects a terminal other than a terminal device originating the reception signal destined to the terminal device, the switching circuit determines that the switching condition is met and switches the time slot for transmission.

3. A communication method adapted for a terminal device that performs communication using one of a plurality of time slots, the method comprising:
    switching a time slot for transmission when a predetermined switching condition is determined to be met by referring to a reception signal received; and
    maintaining the time slot for transmission until the switching condition is determined to be met again by referring to the reception signal received,
    wherein, when the reception signal is not destined to the terminal device and a time slot for the reception signal is identical to the time slot for transmission, determining that the predetermined switching condition is met and switching the time slot for transmission, and
    wherein, when the reception signal is destined to the terminal device and a time slot for the reception signal is different from the time slot for transmission, determining that the predetermined switching condition is met and switching the time slot for transmission.

4. A terminal device in a home group, comprising:
    a communication circuit that performs communication using one of a plurality of time slots in a communication channel; and
    a switching circuit that:
        switches a time slot for transmission when a predetermined switching condition is determined to be met by referring to a reception signal received in the communication circuit, and
        maintains the time slot for transmission until the predetermined switching condition is determined to be met again by referring to the reception signal,
    wherein, when the reception signal is not destined to the terminal device within the home group of the terminal device and a time slot for the reception signal is identical to the time slot for transmission, the switching circuit determines that the switching condition is met and switches the time slot for transmission, and
    wherein, when the reception signal is destined to the terminal device within the home group of the terminal device and a time slot for the reception signal is different from the time slot for transmission, the switching circuit determines that the switching condition is met and switches the time slot for transmission.

5. The terminal device according to claim 4, further comprising a destination of transmission selection circuit, and
    wherein when the reception signal is destined to the terminal device within the home group, a time slot for the reception signal is identical to the time slot for transmission, and the destination of the transmission selection circuit selects a terminal other than a terminal device originating the reception signal destined to the terminal device, the switching circuit determines that the switching condition is met and switches the time slot for transmission.

* * * * *